(12) United States Patent
Miwa (10) Patent No.: US 9,975,384 B2
(45) Date of Patent: May 22, 2018

(54) MOTORCYCLE TIRE FOR ROUGH TERRAIN

(71) Applicant: Sumitomo Rubber Industries, Ltd., Kobe-shi, Hyogo (JP)

(72) Inventor: Takuya Miwa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 321 days.

(21) Appl. No.: 14/730,515

(22) Filed: Jun. 4, 2015

(65) Prior Publication Data

US 2015/0360517 A1 Dec. 17, 2015

(30) Foreign Application Priority Data

Jun. 17, 2014 (JP) ................................. 2014-124616

(51) Int. Cl.
| | | |
|---|---|---|
| B60C 11/00 | (2006.01) |
| B60C 11/12 | (2006.01) |
| B60C 11/11 | (2006.01) |
| B60C 11/13 | (2006.01) |
| B60C 11/03 | (2006.01) |

(52) U.S. Cl.
CPC ........ B60C 11/1236 (2013.01); B60C 11/032 (2013.01); B60C 11/11 (2013.01); B60C 11/13 (2013.01); B60C 11/1369 (2013.01); B60C 2011/0344 (2013.01); B60C 2011/0351 (2013.01); B60C 2011/0381 (2013.01); B60C 2200/10 (2013.01); B60C 2200/14 (2013.01)

(58) Field of Classification Search
CPC ..... B60C 11/1236; B60C 11/13; B60C 11/11; B60C 11/032
See application file for complete search history.

(56) References Cited

U.S. PATENT DOCUMENTS

2011/0209806 A1* 9/2011 Kishida ............... B60C 11/1236
152/209.23
2012/0018067 A1 1/2012 Hikita

FOREIGN PATENT DOCUMENTS

| EP | 2 374 636 A1 | 10/2011 |
| EP | 2 529 954 A1 | 12/2012 |
| EP | 2 657 048 A1 | 10/2013 |
| JP | 2012-25307 A | 2/2012 |

OTHER PUBLICATIONS

Extended European Search Report dated Dec. 16, 2015 for Application No. 15169583.0.

* cited by examiner

Primary Examiner — Timothy Kennedy
(74) Attorney, Agent, or Firm — Birch, Stewart, Kolasch & Birch, LLP (57) ABSTRACT

A motorcycle tire for rough terrain is provided in tread middle regions with middle blocks each provided in its ground contacting top surface with an auxiliary groove extending in the tire circumferential direction.

6 Claims, 9 Drawing Sheets

MOTORCYCLE TIRE FOR ROUGH TERRAIN

BACKGROUND OF THE INVENTION

The present invention relates to a motorcycle tire for rough terrain, more particularly to a tread pattern comprising blocks capable of improving cornering performance.

Japanese Patent Application Publication No. 2012-25307 discloses a motorcycle tire for rough terrain whose tread crown region is provided with sparsely-arranged crown blocks in order to improve the cornering performance when running on rough terrain without sacrificing the traction performance during straight running.

In general, a motorcycle is largely leaned during cornering or turning and the camber angle of the tire is increased, and the tread portion mainly contacts with the ground in a tread middle region between the tread crown region and a tread shoulder region.

In the motorcycle tire disclosed in the above-mentioned patent document, although an arrangement of the crown blocks in the tread crown region are contrived, it is not enough to improve the cornering performance when running on rough terrain.

SUMMARY OF INVENTION

It is therefore, an object of the present invention to provide a motorcycle tire, in which middle blocks disposed in tread middle regions are improved in their arrangement and configurations to improve the cornering performance when running on rough terrain.

According to the present invention, a motorcycle tire for rough terrain comprises a tread portion which is, when an axial developed width of the tread portion from the tire equator to each tread edge is trisected into an axially inner crown region, an axially outer shoulder region and a middle region therebetween, provided with middle blocks in the middle regions, wherein each middle block provided in its ground contacting top surface with an auxiliary groove extending in the tire circumferential direction.

Preferably, the depth of each auxiliary groove is in a range of from 15% to 35% of the height of the middle block.

Preferably, the auxiliary grooves include those having both circumferential ends opened.

Preferably, each auxiliary groove is disposed in a central region of the ground contacting top surface so that a center line of the auxiliary groove in its widthwise direction is positioned within the central region which is defined as having a constant axial width and extending between 1/3 and 2/3 of the maximum axial width of the ground contacting top surface.

Preferably, the groove width of each auxiliary groove is 15% to 35% of the maximum axial width of the ground contacting top surface.

Preferably, the maximum axial width of the ground contacting top surface of each middle block is 10% to 25% of a developed tread width of the tread portion between the tread edges.

Preferably, the auxiliary groove has, in its cross section,
a pair of groove walls extending straight radially inwardly from the ground contacting top surface,
a groove bottom in which the maximum groove depth occurs, and an arc part smoothly connecting between each groove wall and the groove bottom.

Preferably, the arc parts has a radius of curvature of 1 to 6 mm.

Preferably, the auxiliary grooves include those having a constant groove width.

Preferably, the auxiliary grooves include those extending straight in parallel with the tire circumferential direction.

Therefore, during cornering, the edges of the middle blocks and the auxiliary grooves dig into the ground to generate large frictional force, and as a result, the cornering performance can be improved.

Further, the auxiliary grooves facilitate deformation of the middle blocks during cornering, and increase the digging-into-ground of the edges on the tire equator side, of the middle blocks, therefore, the frictional force during cornering is further increased.

Furthermore, owing to the auxiliary groove, the lateral stiffness of the middle block is reduced so as to prevent the occurrence of sudden side skid during cornering.

In this application, various dimensions, positions and the like of the tire refer to those under a normally inflated unloaded condition of the tire unless otherwise noted. The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

BRIEF DESCRIPTION OF THE DRAWINGS

Embodiments of the present invention will now be described in detail in conjunction with the accompanying drawings.

Figure 1:
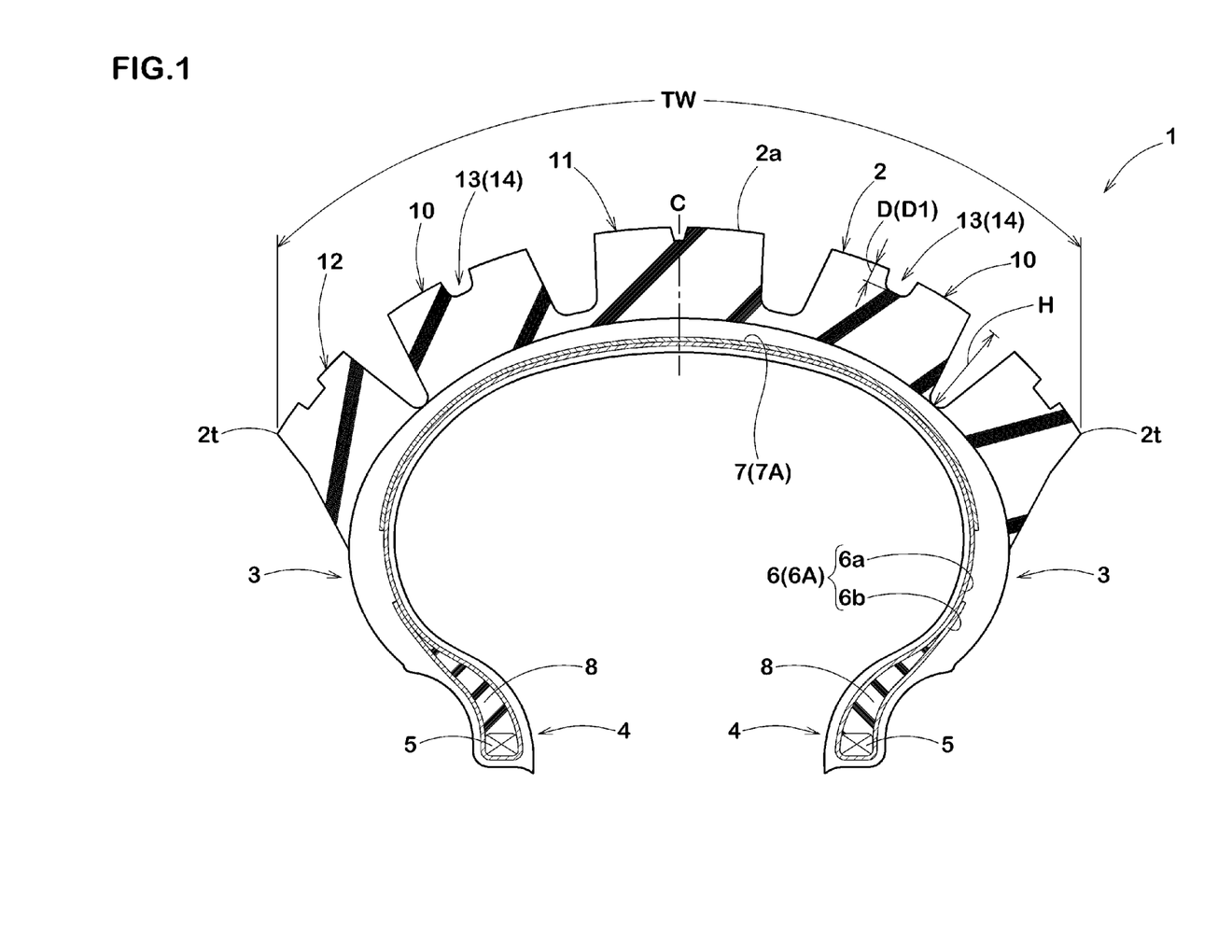
FIG. 1 is a cross sectional view of a motorcycle tire as an embodiment of the present invention.

As shown in FIG. 1, a motorcycle tire 1 for rough terrain according to the present invention comprises a tread portion 2, a pair of sidewall portions 3, a pair of axially spaced bead portions 4 each with a bead core 5 therein, a carcass 6 extending between the bead portions 4 through the tread portion 2 and the sidewall portions 3, and a tread reinforcing layer 7 disposed radially outside the carcass 6 in the tread portion 2.

As a characteristic of a motorcycle tire, the tread portion 2 is convexly curved so that the tread face 2a between the tread edges 2t is curved like an arc swelling radially outwardly, and the maximum cross sectional width of the tire 1 occurs between the tread edges 2t.

Between the tread edges 2t of the developed tread surface 2a, the developed tread width TW is defined.

The carcass 6 in this example is composed of a single ply 6A of carcass cords arranged radially at an angle in a range of from 75 to 90 degrees, preferably 80 to 90 degrees with respect to the tire equator C, and the ply 6A extends between the bead portions 4 through the tread portion 2 and sidewall portions 3 and is turned up around the bead core 5 in each bead portion to form a pair of turned up portions 6b and a main portion 6a therebetween. For the carcass cords, organic fiber cords, for example, nylon, polyester, rayon and the like are suitably used.

Each bead portion 4 is provided between the main portion 6a and the turned up portion 6b with a bead apex rubber 8 made of hard rubber.

The tread reinforcing layer 7 is composed of at least one ply, in this example, only one ply 7A of reinforcing cords laid at an angle in a range of from 5 to 40 degrees with respect to the tire equator C. For the reinforce cords, for example, steel cords, aramid cords, rayon cords and the like are suitably used.

Figure 2:
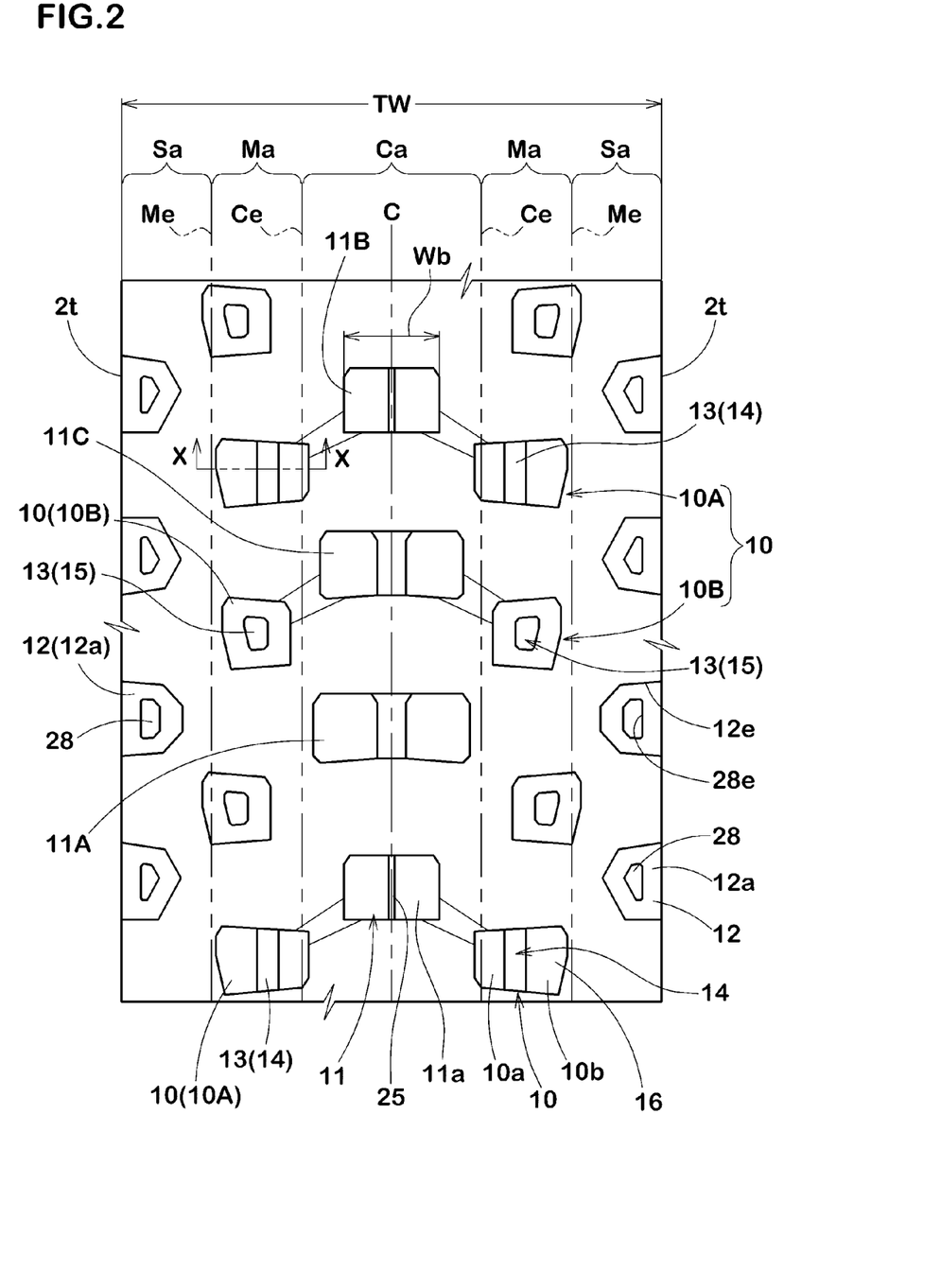
FIG. 2 is a developed partial view of the tread portion of the motorcycle tire showing a tread pattern.

As shown in FIG. 2, the tread portion 2 is imaginary axially divided into a crown region Ca which is centered on the tire equator C and has a developed axial width of ⅓ of the developed tread width TW, a pair of shoulder regions Sa each of which extends axially inwardly from one of the tread edges 2t and has a developed axial width of ⅙ of the developed tread width TW, and a pair of middle regions Ma between the crown region Ca and the respective shoulder regions Sa each having a developed axial width of ⅙ of the developed tread width TW.

The tread portion contacts with the ground mainly in the crown region Ca during straight running and during cornering at small camber angles. The shoulder region Sa contacts with the ground during cornering at large camber angles. The middle region Ma contacts with the ground during cornering at small camber angles and large camber angles.

The tread portion 2 is provided with blocks 10, 11 and 12. According to the axial position of the centroid of a contour shape of the ground contacting top surface 16 of a block, a block 10 whose centroid is positioned within a middle region Ma is called "middle block", a block 11 whose centroid is positioned within the crown region Ca is called "crown block", and a block 12 whose centroid is positioned within a shoulder region Sa is called "shoulder block".

Figure 3:
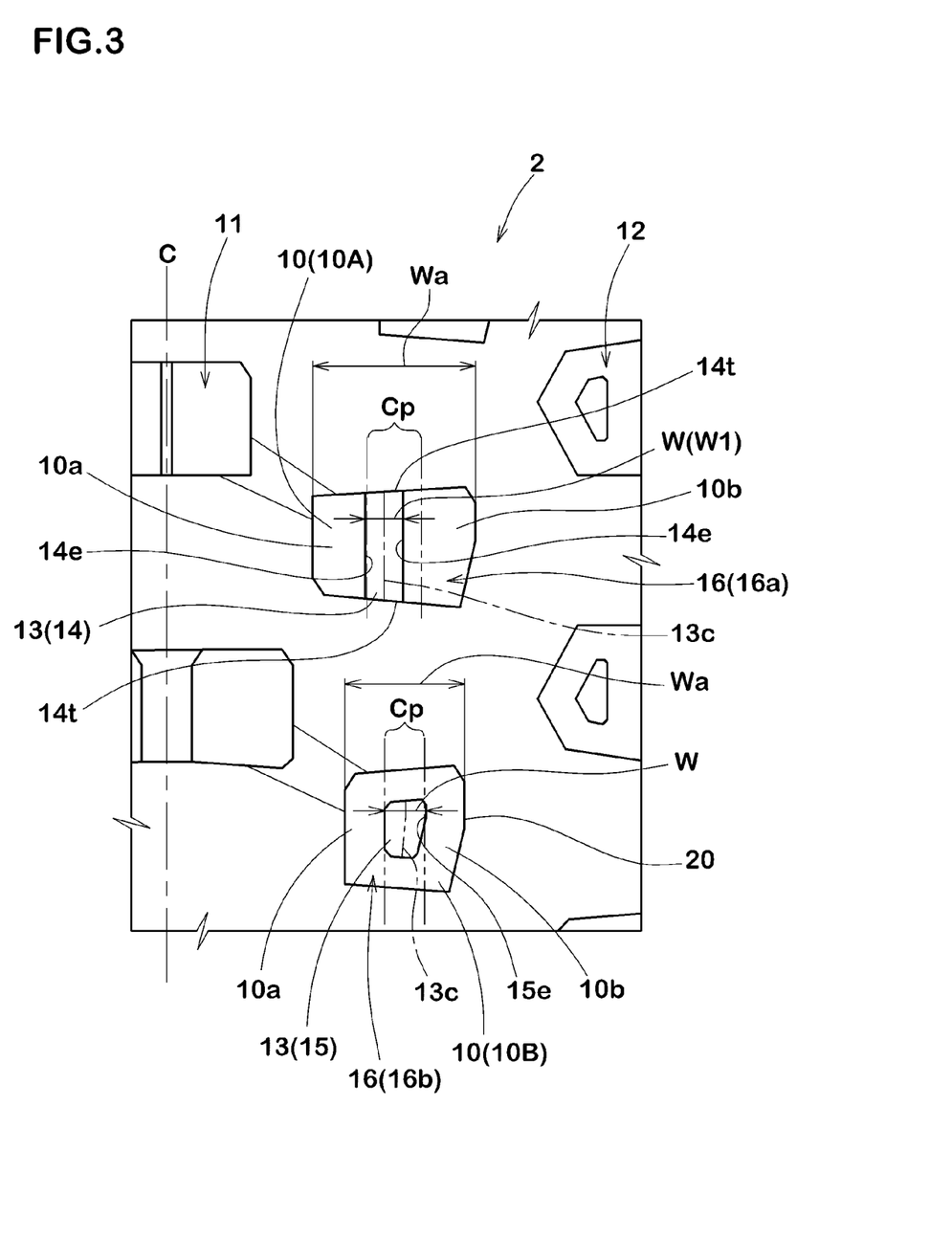
FIG. 3 is a closeup of a right-hand part of the tread portion shown in FIG. 2.

The tread portion 2 may be provided with so called tie bar connecting between the adjacent blocks (10, 11, 12). In such case, if a tie bar has a height of less than 50% of the height of the connected blocks the tie bar is considered as a separate part from the blocks. If a tie bar has a height of 50% or more of the height of the connected blocks, the tie bar is considered as a part of the connected blocks. In other words, the tie bar and the connected blocks are considered as one block As shown in FIG. 3, the ground contacting top surface 16 of each middle block 10 has a maximum width Wa in the tire axial direction which is preferably in a range of from 10% to 25% of the developed tread width TW.

If the maximum width Wa is less than 10% of the developed tread width TW, the rigidity of the middle block 10 is decreased and it becomes difficult to improve the cornering performance. If the maximum width Wa is more than 25% of the developed tread width TW, the groove volume among the blocks is decreased, and further digging of the blocks into the ground surface in rough terrain decreases, therefore, there is a possibility that the running performance in rough terrain is deteriorated.

The ground contacting top surface 16 of each middle block 10 is provided in a central region with an auxiliary groove 13 extending in the tire circumferential direction. There is no void (groove) in the axially inner block part 10a defined as being axially inside the auxiliary groove 13 and the axially outer block part 10b defined as being axially outside the auxiliary groove 13.

Figure 4:
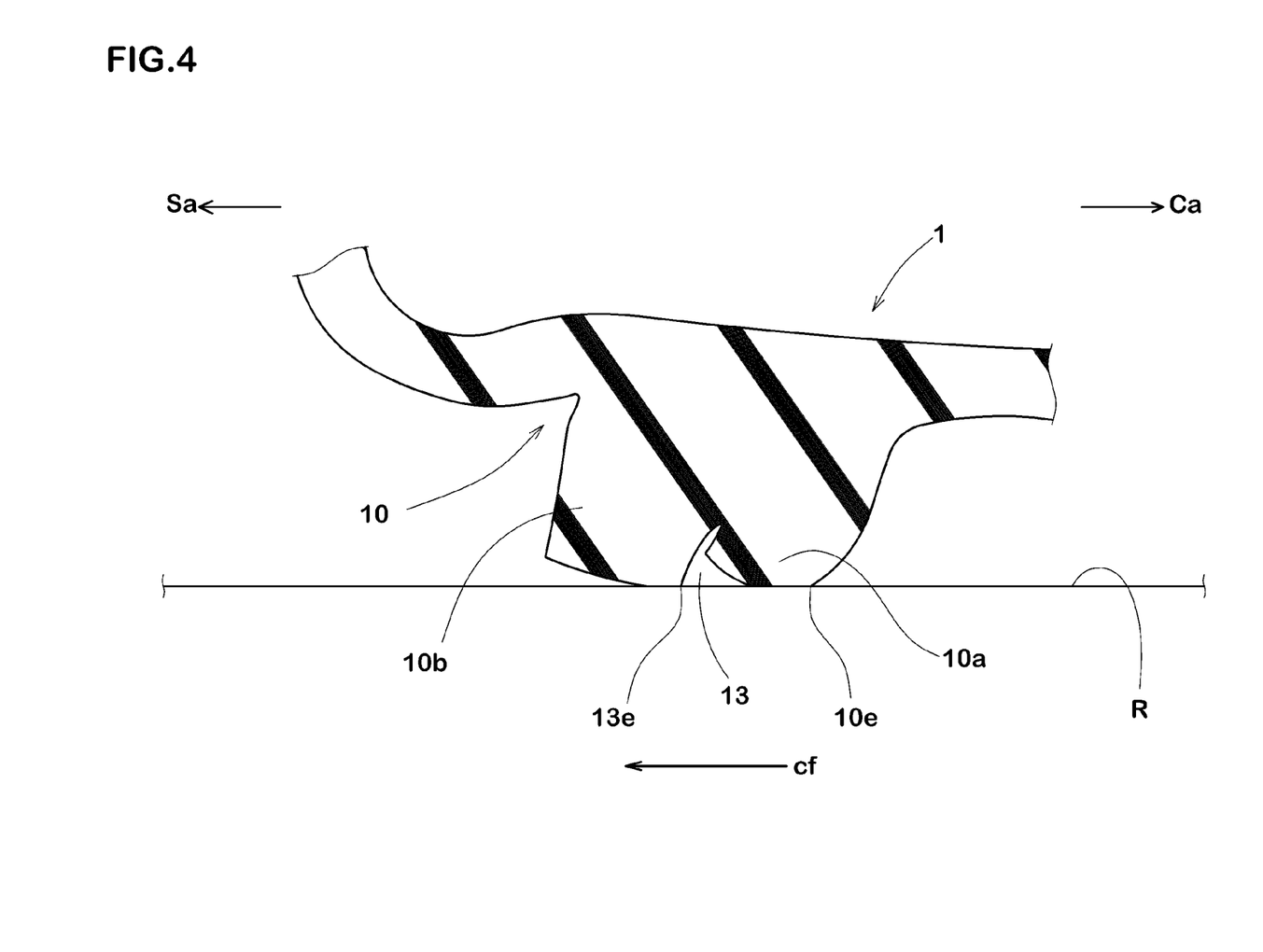
FIG. 4 is a cross sectional view of a middle block taken along line x-x of FIG. 2 schematically showing its deformed state during cornering.

As show in FIG. 4, during cornering, the middle block 10 is subjected to a centrifugal force cf toward the tire equator.

Therefore, the middle block 10 is deformed so that the block edge 10e and the edge 13e of the auxiliary groove 13 dig into the ground R to generate a large frictional force. As a result, the cornering performance can be improved. Further, the lateral stiffness of the middle block 10 is reduced by the auxiliary groove 13, side skid suddenly occurred during cornering can be prevented.

As shown in FIG. 3, the auxiliary groove 13 is disposed such that a center line 13c of the auxiliary groove 13 in its widthwise direction is positioned within a central region Cp defined as extending in the tire axial direction between ⅓ and ⅔ of the maximum axial width Wa of the middle block 10. In this embodiment, the auxiliary groove 13 is disposed within the central region Cp in substance, and no groove is formed outside the central region Cp in order to prevent the rigidity of the middle block 10 from becoming unbalanced between the block parts 10a and 10b.

Therefore, the width W of the auxiliary groove 13 is preferably in a range of from 15% to 35% of the maximum width Wa of the middle block 10.

As shown in FIG. 1, the groove depth D of the auxiliary groove 13 is preferably in a range of from 15% to 35% of the height H of the middle block 10.

If the depth D is more than 35% of the height H, the rigidity of both block parts 10a and 10b of the middle block 10 becomes decreased, and the deformation of the block parts 10a and 10b during cornering is increased. Thus, there is a possibility that side skid suddenly occurred during cornering can not be effectively prevented. If the depth D is less than 15% of the height H, gripping power of the edges 13e of the auxiliary groove 13 becomes decreased, and there is a possibility that the frictional force is decreased.

In this embodiment, the auxiliary grooves 13 include long auxiliary grooves 14 having a longer circumferential length and short auxiliary grooves 15 having a shorter circumferential length.

Since each middle block 10 is provided with only one auxiliary groove 13, the middle blocks 10 include first middle blocks 10A each provided with a long auxiliary groove 14, and second middle blocks 10B each provided with a short auxiliary groove 15.

Each of the long auxiliary grooves 14 has circumferential ends 14t, at least one of which is opened at the sidewall of the first middle block 10A.

In this example, both circumferential ends 14t are opened so that the deformation of each of the block parts 10a and 10b leaning toward the other during cornering is facilitated, and the occurrence of sudden side skid during cornering at larger camber angles can be effectively prevented.

The long auxiliary groove 14 in this example has a constant groove width w1 so that the block parts 10a and 10b maintain circumferential rigidity, and also the gripping power of the edges 14e is maintained to generate a large frictional force.

Further, the long auxiliary groove 14 in this example extends straight in parallel with the tire circumferential direction so that mud, small objects and the like entered in the long auxiliary groove 14 are easily self ejected during running and the auxiliary groove 14 can effectively exert its edge effect.

Figure 5:
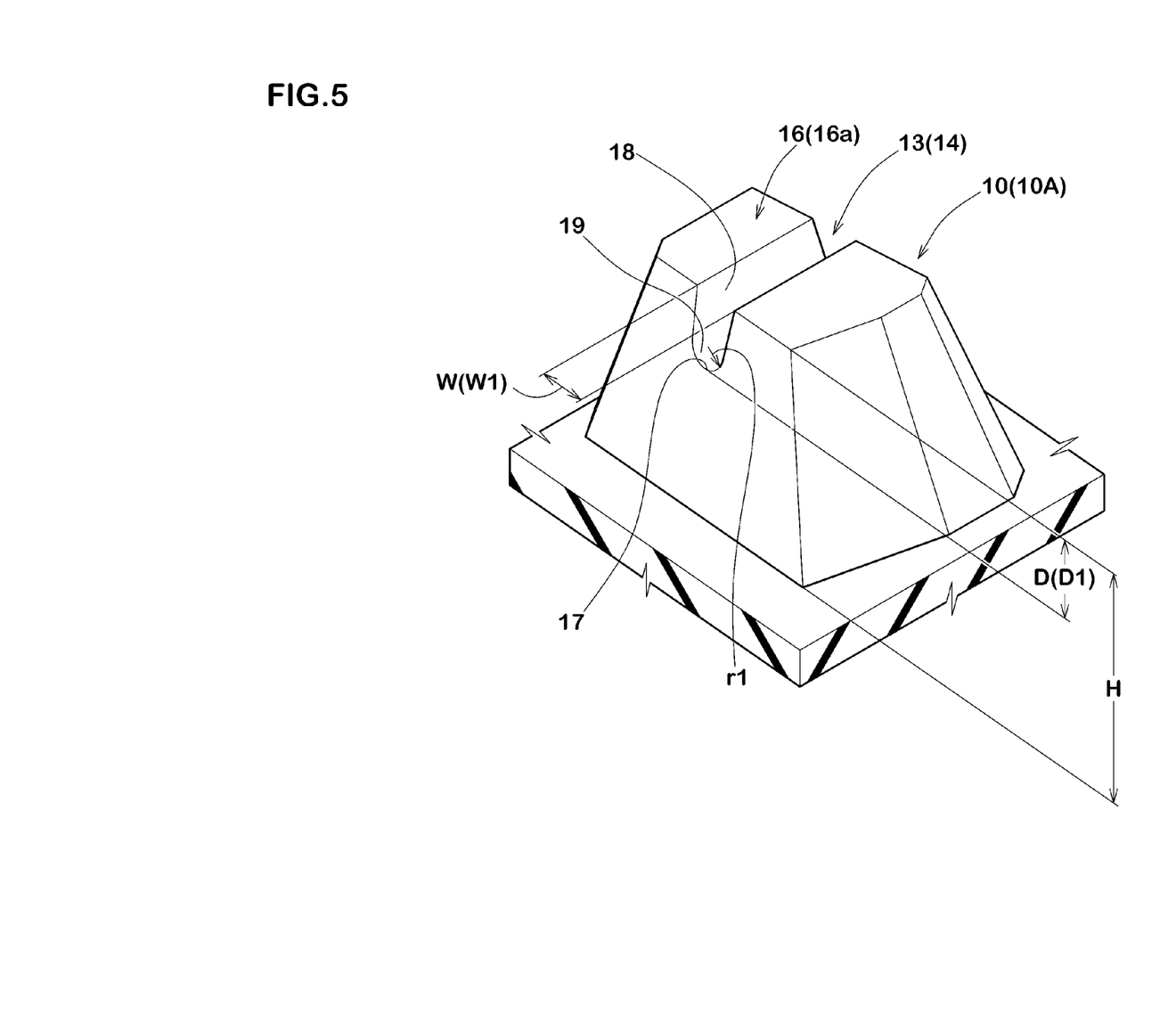
FIG. 5 is a perspective view of a first middle block provided with a long auxiliary groove.

As shown in FIG. 5, the long auxiliary groove 14 has a pair of opposite groove walls 18, a groove bottom 17 in which the maximum groove depth occurs, and an arc part 19 smoothly connecting between each groove wall 18 and the groove bottom 17. In the cross section of the long auxiliary groove 14, each groove wall 18 is straight, and each arc part 19 is a circular arc. Preferably, the arc parts 19 has a radius of curvature r1 of 1 to 6 mm in order to avoid a stress concentration.

In this example, the groove bottom 17 extends along the entire length of the groove, but it has substantially no extent in the groove's widthwise direction. Accordingly, the groove bottom 17 is a deepest point in the cross section, and the two arc parts 19 form a single circular arc.

It is also possible that the groove bottom 17 has a certain extent in the groove's widthwise direction.

As shown in FIG. 3, both ends in the tire circumferential direction of the short auxiliary groove 15 are closed so that the deformation of the block parts 10a and 10b is reduced and the second middle block 10B is provided with high rigidity. Further, the groove can grip the ground during cornering at small camber angles.

In this example, the short auxiliary groove 15 has groove edges 15e substantially parallel with block edges 20 of the second middle block 10B. In other words, the contour shape of the short auxiliary groove 15 in the ground contacting top surface 16 is similar to the contour shape of the ground contacting top surface 16 in order to maintain the rigidity of the second middle block 10B.

Figure 6:
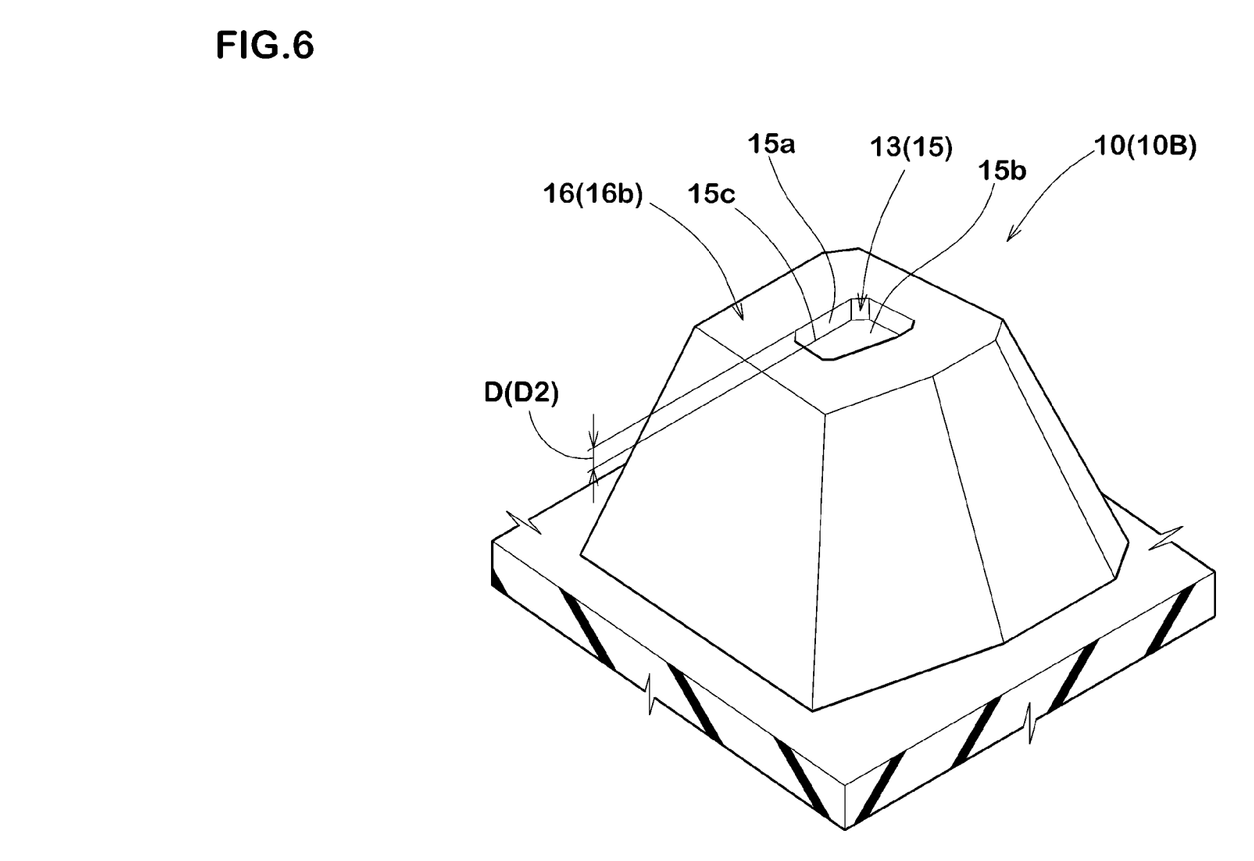
FIG. 6 is a perspective view of a second middle block provided with a short auxiliary groove.
Figure 7:
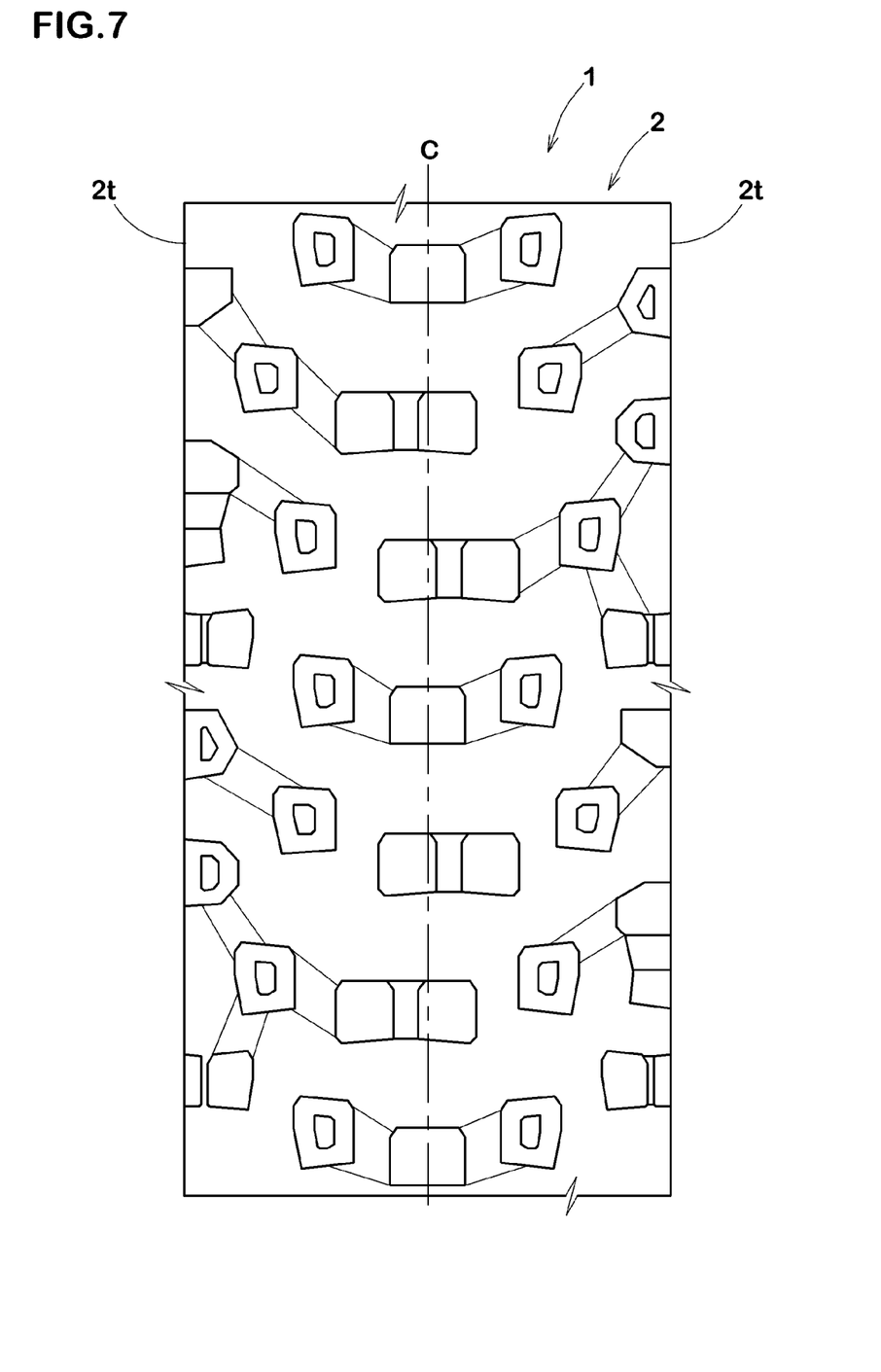
FIG. 7 is a developed partial view of a tread portion of a motorcycle tire as another embodiment of the present invention.
Figure 8:
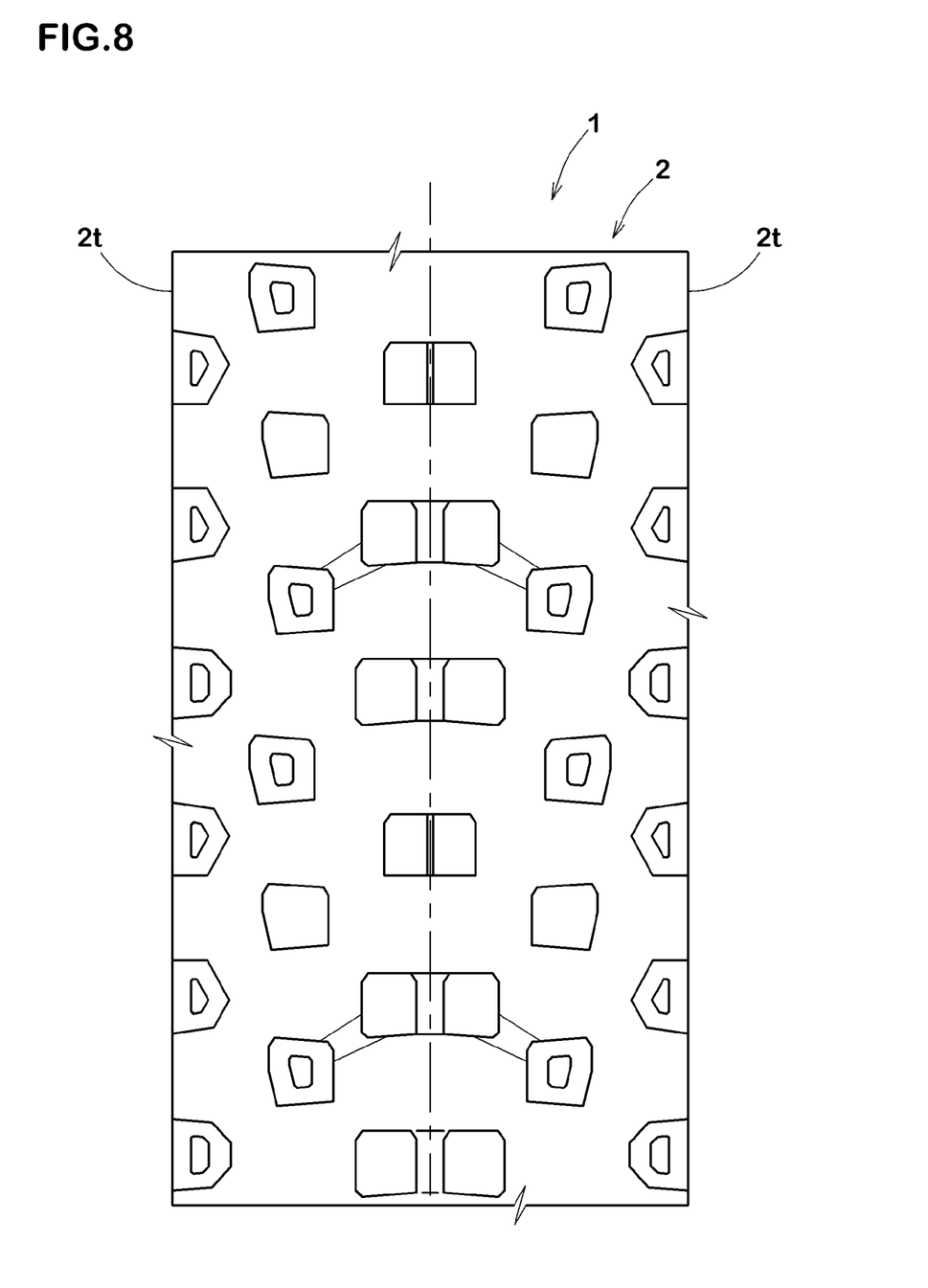
FIG. 8 is a developed partial view of a tread portion of a motorcycle tire as still another embodiment of the present invention.
Figure 9:
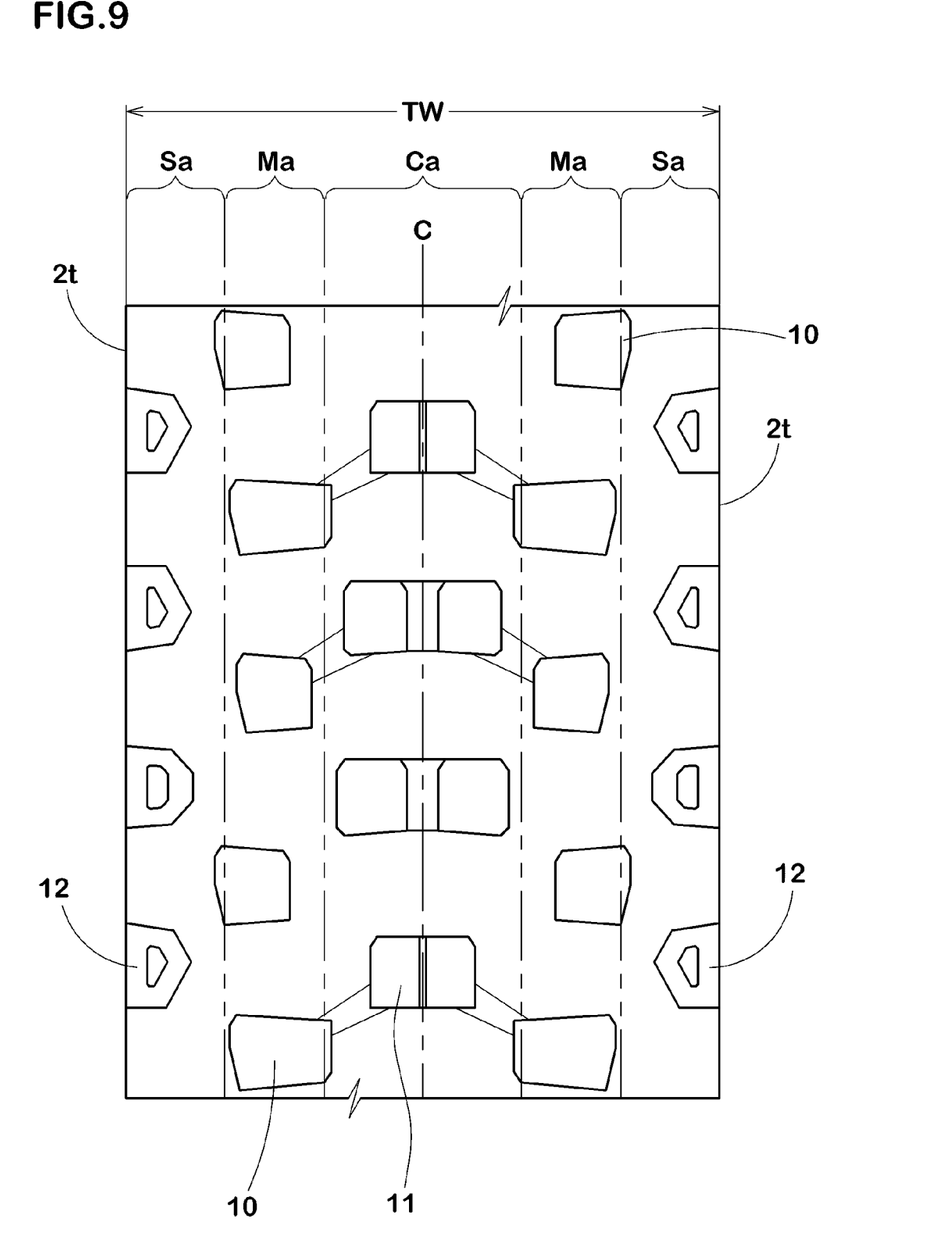
FIG. 9 is a developed partial view of a tread portion of a motorcycle tire as a comparative example.

It is preferable that, as shown in FIG. 6, the short auxiliary groove 15 has a groove depth D2 less than the groove depth D1 of the long auxiliary groove 14 in order to maintain the high rigidity of the second middle block 10B and improve the grip during cornering at small camber angles.

Preferably, the groove depth D2 is set in a range of from 40% to 60% of the groove depth D1.

In the short auxiliary groove 15 in this example, in order to further improve the grip, an angled corner 15c is formed between its groove bottom 15b and groove wall 15a, namely, an arc part smoothly connecting therebetween is not formed although an arc part may be formed similarly to the long auxiliary groove 14.

In this embodiment, as shown in FIG. 2, the number N2 of the second middle blocks 10B is more than the number N1 of the first middle blocks 10A. Preferably, the number N2 is 1.5 to 2.5 times (in this example, 2 times) the number N1 in order that the cornering performance is not largely altered if the camber angle is widely changed.

As shown in FIG. 2, the above-mentioned crown blocks 11 are provided in their ground contacting top surfaces 11a with auxiliary grooves 25 extending in the tire circumferential direction so that mud, small objects and the like entered in the long auxiliary groove 14 are easily self ejected during running. In this embodiment, each auxiliary groove 25 is disposed along the tire equator C so that a motorcycle rider can smoothly stably initiate a cornering or turning operation during straight running.

In this embodiment, the crown blocks 11 include large crown blocks 11A whose maximum axial width Wb is largest, small crown blocks 11B whose maximum axial width Wb is smallest, and middle crown blocks 11C whose maximum width Wb is less than the largest width and more than the smallest width.

The large crown blocks 11A and the middle crown blocks 11C are each provided with a wider auxiliary groove 25 whose both ends are opened, and the small crown blocks 11B are each provided with a narrow auxiliary groove 25 whose both ends are opened.

The above-mentioned shoulder blocks 12 are provided in their ground contacting top surfaces 12a with auxiliary grooves 28.

In this embodiment, each auxiliary groove 28 is not opened at the block sidewall and has edges 28e substantially parallel with block edges 12e of the shoulder block 12 on which the concerned auxiliary groove 28 is formed.

The auxiliary groove 28 can grip the ground during cornering at larger camber angles, while maintaining the rigidity of the shoulder block 12, therefore, the cornering performance on rough terrain can be further improved.

Comparison Tests

Motorcycle tires having the internal structure shown in FIG. 1 were experimentally manufactured and tested the cornering performance.
Specifications of the test tires are shown in Table 1.
Other specifications were identical.
  tire size: 120/80-19 (rim: 2.15×19)
  developed tread width TW: 172 mm
  middle blocks' height H: 16.0 mm
<Cornering Performance Test>

Each test tire (tire pressure 80 kPa) was mounted on a rear wheel of a 450cc motocross bike, and during running in a motocross course, a test rider evaluated cornering performance into ten ranks based on the handle response, rigid feeling and grip.

The results are shown in Table 1, wherein the larger the rank number, the better the performance.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|---|
| tread pattern (FIG. no.) | 9 | 1 | 1 | 1 | 1 | 1 | 1 | 1 | 1 | 1 | 1 | 1 | 1 | 1 | 7 | 8 |
| long auxiliary groove depth D1/H (%) | — | 25 | 10 | 15 | 35 | 40 | 25 | 25 | 25 | 25 | 25 | 25 | 25 | 25 | 25 | 25 |
| short auxiliary groove depth D2/H (%) | 20 | | | | | | | | | | | | | | | |
| auxiliary groove width W/TW (%) | — | 25 | 25 | 25 | 25 | 25 | 10 | 15 | 35 | 40 | 25 | 25 | 25 | 25 | 25 | 25 |
| groove number ratio N2/N1 | — | 2.0 | 2.0 | 2.0 | 2.0 | 2.0 | 2.0 | 2.0 | 2.0 | 2.0 | 1.0 | 1.5 | 2.5 | 3.0 | — | — |
| cornering performance | | | | | | | | | | | | | | | | |
| @ small camber angle | 5 | 9 | 9 | 9 | 9 | 9 | 9 | 9 | 9 | 9 | 8 | 8 | 9 | 9 | 8 | 7 |
| @ middle camber angle | 5 | 9 | 8 | 9 | 9 | 8 | 8 | 9 | 9 | 8 | 8 | 9 | 9 | 8 | 7 | 7 |
| @ large camber angle | 5 | 9 | 8 | 9 | 9 | 8 | 8 | 9 | 9 | 8 | 9 | 9 | 8 | 8 | 7 | 7 |

The invention claimed is:

1. A motorcycle tire for rough terrain comprising:
a tread portion which is curved convexly so that a maximum cross sectional width of the tire occurs between tread edges, and which is,
when an axial developed width of the tread portion from a tire equator to each tread edge is trisected into an axially inner crown region, an axially outer shoulder region and a middle region therebetween, provided with middle blocks in the middle regions,
wherein each of the middle blocks is provided in a ground contacting top surface with a single auxiliary groove extending in the tire circumferential direction,
wherein the auxiliary grooves include a first auxiliary groove extending an entire circumferential length of the middle block to have both circumferential ends respectively opened in the tire circumstantial direction of the middle block,
wherein a depth of said first auxiliary groove is in a range from 15% to 35% of a height of the middle block,
wherein a width of said first auxiliary groove is in a range from 15% to 35% of a maximum axial width of the ground contacting top surface,
wherein the maximum axial width of the ground contacting top surface is in a range from 10% to 25% of a developed tread width of the tread portion between the tread edges,
wherein said single auxiliary groove has, in its cross section, a pair of groove walls extending radially inwardly from the ground contacting top surface, a groove bottom in which the maximum groove depth occurs, and an arc part smoothly connecting between each of the groove walls and the groove bottom, and
wherein the arc part has a radius of curvature in a range from 1 to 6 mm.

2. The motorcycle tire for rough terrain according to claim 1, wherein the auxiliary grooves further include a second auxiliary groove having a first circumferential end opened and a second circumferential end closed.

3. The motorcycle tire for rough terrain according to claim 1, wherein each first auxiliary groove is disposed in a central region of the ground contacting top surface so that a widthwise center line of the first auxiliary groove is positioned within the central region which is defined as having a constant axial width and extending between ⅓ and ⅔ of the maximum axial width of the ground contacting top surface.

4. The motorcycle tire for rough terrain according to claim 1, wherein each of the first auxiliary grooves has a constant groove width.

5. The motorcycle tire for rough terrain according to claim 1, wherein each of the first auxiliary grooves extends straight in parallel with the tire circumferential direction.

6. The motorcycle tire for rough terrain according to claim 2, wherein
said first auxiliary groove is disposed in a central region of the ground contacting top surface so that a widthwise center line of the auxiliary groove is positioned within the central region which is defined as having a constant axial width and extending between ⅓ and ⅔ of the maximum axial width of the ground contacting top surface.

* * * * *